United States Patent
Kyoung et al.

(10) Patent No.: US 10,899,921 B2
(45) Date of Patent: Jan. 26, 2021

(54) THERMOPLASTIC RESIN COMPOSITION HAVING PAPER TEXTURE, AND MOLDED PRODUCT FORMED THEREFROM

(71) Applicant: LOTTE ADVANCED MATERIALS CO., LTD., Yeosu-si (KR)

(72) Inventors: Jun Hyouk Kyoung, Uiwang-si (KR); Min Ji Ju, Uiwang-si (KR); Soo Kyung Kahng, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 401 days.

(21) Appl. No.: 15/754,738

(22) PCT Filed: Aug. 30, 2016

(86) PCT No.: PCT/KR2016/009648
§ 371 (c)(1),
(2) Date: Feb. 23, 2018

(87) PCT Pub. No.: WO2017/039281
PCT Pub. Date: Mar. 9, 2017

(65) Prior Publication Data
US 2020/0224021 A1 Jul. 16, 2020

(30) Foreign Application Priority Data

Aug. 31, 2015 (KR) .................. 10-2015-0122935

(51) Int. Cl.
*C08K 7/14* (2006.01)
*C08L 51/04* (2006.01)

(52) U.S. Cl.
CPC ........... *C08L 51/04* (2013.01); *C08L 2207/53* (2013.01)

(58) Field of Classification Search
CPC ...... C08L 51/04; C08L 2207/53; C08L 25/12; C08L 2205/025; C08L 2205/03; C08K 7/14
USPC ........................................ 523/201
See application file for complete search history.

(56) References Cited

U.S. PATENT DOCUMENTS

| | | | |
|---|---|---|---|
| 5,059,639 A * | 10/1991 | Ohkura | C09D 7/42 523/205 |
| 5,162,419 A | 11/1992 | Pottier-Metz et al. | |
| 8,403,978 B2 | 3/2013 | Schlun et al. | |
| 8,735,490 B2 | 5/2014 | Chung et al. | |
| 9,327,435 B2 | 5/2016 | Suga et al. | |
| 9,353,253 B2 | 5/2016 | Chae et al. | |
| 9,403,978 B2 | 8/2016 | Kwon et al. | |
| 2010/0075165 A1 * | 3/2010 | Cho | B32B 27/08 428/519 |
| 2010/0331475 A1 * | 12/2010 | Hong | C08F 279/02 524/504 |
| 2015/0152205 A1 | 6/2015 | Kim et al. | |
| 2015/0376386 A1 * | 12/2015 | Kim | C08L 25/12 525/72 |

FOREIGN PATENT DOCUMENTS

| | | |
|---|---|---|
| CN | 1946533 A | 4/2007 |
| CN | 103910985 A | 7/2014 |
| JP | 4-348158 A | 12/1992 |
| JP | 2002-212400 A | 7/2002 |
| JP | 2002-220517 A | 8/2002 |
| JP | 2008-31231 A | 2/2008 |
| JP | 2009-084569 A | 4/2009 |
| JP | 2015-108140 A | 6/2015 |
| JP | 2015-134930 A | 7/2015 |
| KR | 10-1997-0074856 A | 12/1997 |
| KR | 10-0169731 B1 | 3/1999 |
| KR | 10-2011-0079489 A | 7/2011 |
| KR | 10-2014-0092485 A | 7/2014 |
| KR | 10-2015-0078897 A | 7/2015 |
| WO | 2017/039281 A1 | 3/2017 |

OTHER PUBLICATIONS

Machine Translation of JP 2009-084569 (Year: 2009).*
Office Action in counterpart Japanese Application No. 2018-530456 dated Feb. 4, 2020, pp. 1-5.
Office Action in counterpart Chinese Application No. 201680049772.1 dated Sep. 10, 2019, pp. 1-7.
International Search Report in counterpart International Application No. PCT/KR2016/009648 dated Dec. 13, 2016, pp. 1-4.

* cited by examiner

*Primary Examiner* — Hannah J Pak
(74) *Attorney, Agent, or Firm* — Additon, Higgins & Pendleton, P.A.

(57) ABSTRACT

A thermoplastic resin composition of the present invention comprises: a rubber-modified aromatic vinyl-based resin; a quencher; a needle-like filler; and a plate-shaped filler, wherein the quencher is a polymer of a reaction mixture comprising an aromatic vinyl-based compound, a cyanovinyl-based compound and a silicon-based compound. The thermoplastic resin composition can implement the visual and tactile texture felt in paper.

11 Claims, 1 Drawing Sheet

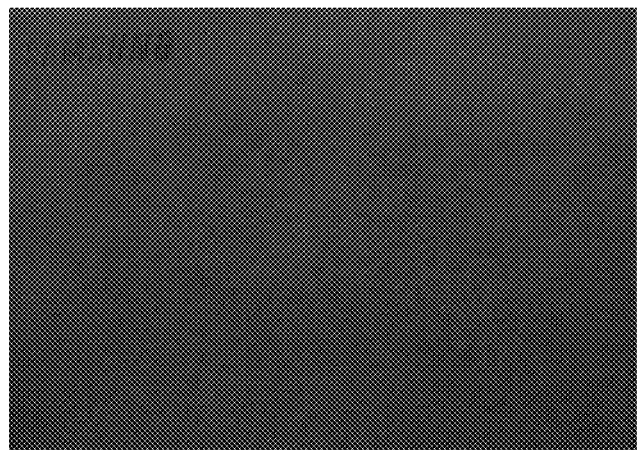

THERMOPLASTIC RESIN COMPOSITION HAVING PAPER TEXTURE, AND MOLDED PRODUCT FORMED THEREFROM

CROSS-REFERENCE TO RELATED APPLICATIONS

This application claims priority to and the benefit of International Application No. PCT/KR2016/009648, filed Aug. 30, 2016, which published as WO 2017/039281 on Mar. 9, 2017; and Korean Patent Application No. 10-2015-0122935, filed in the Korean Intellectual Property Office on Aug. 31, 2015, the entire disclosure of each of which is incorporated herein by reference.

TECHNICAL FIELD

The present invention relates to a thermoplastic resin composition having paper-like textures and a molded product formed therefrom. More particularly, the present invention relates to a thermoplastic resin composition which can exhibit visual and tactile textures of paper, and a molded product formed therefrom.

BACKGROUND ART

A thermoplastic resin has a lower specific gravity than glass or metal and has excellent properties in terms of formability and impact resistance and is useful as a material for housings of electric/electronic products, exterior/interior materials for automobiles and exterior/interior materials for buildings. Thus, a thermoplastic resin composition is used in various fields, and demand for materials having various textures, for example, paper-like textures, which can meet consumers' needs for a product with luxurious appearance, is also increasing.

Typical thermoplastic resins having paper-like textures are prepared by simple handicrafts, for example, by mixing paper pulp with a thermoplastic resin or by attaching paper to a resin-molded product. However, a thermoplastic resin prepared by these methods can have poor physical properties, and a separate bonding process is required, causing deterioration in economic feasibility.

In addition, conventionally, evaluation of paper-like textures of such a thermoplastic resin has been done abstractly, making it difficult to prove the actual effect thereof.

Therefore, there is a need for a thermoplastic resin composition which can exhibit visual and tactile textures of paper, such as rain-proof paper, mat paper and 100% cotton paper, without using paper pulp, and a molded product formed therefrom.

The background technique of the present invention is disclosed in Korean Patent Publication No. 10-1997-0074856.

DISCLOSURE

Technical Problem

The present invention is aimed at providing a thermoplastic resin composition which can exhibit visual and tactile textures of paper, and a molded product formed therefrom.

The above and other objects of the present invention can be completely achieved by the present invention as described below.

Technical Solution

One aspect of the present invention relates to a thermoplastic resin composition having paper-like textures. The thermoplastic resin composition includes: a rubber-modified aromatic vinyl resin; a matting agent; needle-like fillers; and flake fillers, wherein the matting agent is a polymer of a reaction mixture comprising an aromatic vinyl compound, a vinyl cyanide compound, and a silicone compound.

In one embodiment, the thermoplastic resin composition may include about 100 parts by weight of the rubber-modified aromatic vinyl resin, about 1 part by weight to about 30 parts by weight of the matting agent, about 5 parts by weight to about 30 parts by weight of the needle-like fillers, and about 0.1 parts by weight to about 5 parts by weight of the flake fillers.

In one embodiment, the rubber-modified aromatic vinyl copolymer resin may include: about 10 wt % to about 100 wt % of a graft copolymer resin obtained by grafting an aromatic vinyl monomer and a monomer copolymerizable with the aromatic vinyl monomer to a rubber polymer having an average (Z-average) particle size of about 0.2 μm to about 15 μm; and optionally about 90 wt % or less of an aromatic vinyl copolymer resin obtained by copolymerizing an aromatic vinyl monomer with a monomer copolymerizable with the aromatic vinyl monomer.

In one embodiment, the silicone compound may be present in an amount of 0.1 parts by weight to about 20 parts by weight relative to about 100 parts by weight of a monomer mixture comprising about 60 wt % to about 80 wt % of the aromatic vinyl compound and about 20 wt % to about 40 wt % of the vinyl cyanide compound.

In one embodiment, the silicone compound may include at least one of a first silicone compound represented by Formula 1 and a second silicone compound represented by Formula 2:

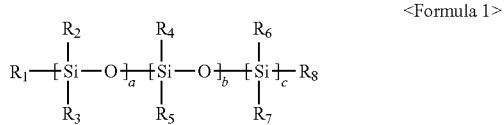

<Formula 1>

(wherein a, b and c are each independently an integer of 0 to 79 (a, b and c not being 0 at the same time, a+b+c ranging from 1 to 79); $R_1$ to $R_8$ are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; at least two of $R_1$ to $R_8$ are a polymerizable unsaturated reactive group; and the compound represented by Formula 1 has a linear structure or a cyclic structure in which $R_1$ to $R_8$ are linked together or form a single bond.); and

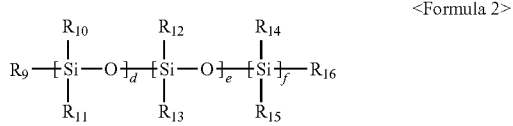

<Formula 2>

(wherein d, e and f are each independently an integer of 0 to 1,500 (d, e and f not being 0 at the same time, d+e+f ranging from 80 to 1,500); $R_9$ to $R_{16}$ are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; and at least two of $R_9$ to $R_{16}$ are a polymerizable unsaturated reactive group.).

In one embodiment, the first silicone compound may include a compound represented by Formula 3:

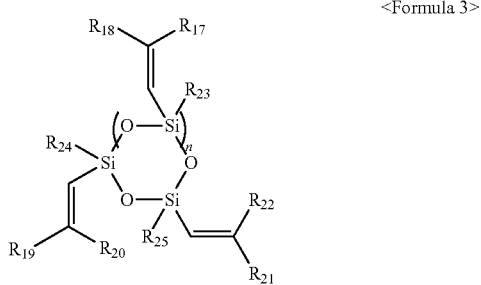

<Formula 3>

(wherein $R_{17}$ to $R_{22}$ are each independently a hydrogen atom, a substituted or unsubstituted $C_1$ to $C_{20}$ alkyl group, a substituted or unsubstituted $C_2$ to $C_{20}$ alkenyl group, a substituted or unsubstituted $C_6$ to $C_{20}$ aryl group; $R_{23}$ to $R_{25}$ are each independently a hydrogen atom or a substituted or unsubstituted $C_1$ to $C_6$ alkyl group; and n is an integer of 1 to 6.).

In one embodiment, the first silicone compound may have a weight average molecular weight of about 150 g/mol to about 3,000 g/mol, and the second silicone compound may have a weight average molecular weight of about 6,500 g/mol to about 30,000 g/mol.

In one embodiment, the reaction mixture may further include a polyfunctional vinyl compound including at least one selected from among divinyl benzene, ethylene glycol di(meth)acrylate, allyl (meth)acrylate, diallyl phthalate, diallyl maleate, and triallyl isocyanurate.

In one embodiment, the needle-like fillers may include at least one of glass fibers, wollastonite, whisker, and basalt fibers, and the flake fillers may include at least one of (synthetic) mica, talc, and metal flakes.

In one embodiment, a weight ratio of the flake fillers to the needle-like fillers may range from about 1:2.5 to about 1:15.

In one embodiment, the thermoplastic resin composition may further include a dye, a pigment, or a combination thereof.

In one embodiment, the thermoplastic resin composition may have a surface roughness (Ra) of about 2.5 μm to about 3.5 μm, as measured on an injection-molded specimen in accordance with ASTM D4417-B.

In one embodiment, the thermoplastic resin composition may have a gloss (60°) of about 35% to about 55%, as measured on an injection-molded specimen at an angle of 60° in accordance with ASTM D523.

Another aspect of the present invention relates to a molded product formed of the thermoplastic resin composition set forth above.

Advantageous Effects

The present invention provides a thermoplastic resin composition which can exhibit visual and tactile textures of paper, and a molded product formed therefrom.

DESCRIPTION OF DRAWINGS

FIG. 1 is an image of a surface of a specimen prepared in Example 1.

BEST MODE

Hereinafter, embodiments of the present invention will be described in detail.

A thermoplastic resin composition according to the present invention can exhibit visual and tactile textures of paper and includes (A) a rubber-modified aromatic vinyl resin; (B) a matting agent; (C) needle-like fillers; and (D) flake fillers.

(A) Rubber-Modified Aromatic Vinyl Resin

The rubber-modified aromatic vinyl resin according to the present invention is a thermoplastic resin having good properties in terms of impact resistance, flowability, heat resistance, and balance therebetween and may have a variety of purposes such as interior/exterior materials for buildings or automobiles.

In one embodiment, the rubber-modified aromatic vinyl resin may include: about 10% by weight (wt %) to about 100 wt % of (a1) a graft copolymer resin obtained by grafting an aromatic vinyl monomer and a monomer copolymerizable with the aromatic vinyl monomer to a rubber polymer; and optionally about 90 wt % or less of (a2) an aromatic vinyl copolymer resin obtained by copolymerizing an aromatic vinyl monomer with a monomer copolymerizable with the aromatic vinyl monomer. In other words, as the rubber-modified aromatic vinyl resin according to the present invention, the graft copolymer resin (a1) may be used alone or in combination with the aromatic vinyl copolymer resin (a2).

In one embodiment, the graft copolymer resin (a1) may be obtained through a process in which an aromatic vinyl monomer and a monomer copolymerizable with the aromatic vinyl monomer are added to a rubber polymer, followed by polymerization, and the aromatic vinyl copolymer resin (a2) may be obtained through a process in which an aromatic vinyl monomer is added to a monomer copolymerizable with the aromatic vinyl monomer, followed by polymerization. Here, polymerization may include any typical polymerization method known in the art, such as emulsion polymerization, suspension polymerization, and mass polymerization. When mass polymerization is employed, it is possible to prepare a rubber-modified aromatic vinyl copolymer resin in which the graft copolymer resin (a1) is dispersed in a matrix, i.e., the aromatic vinyl copolymer resin (a2) through a one-step reaction process, without a need to separately prepare the graft copolymer resin (a1) and the aromatic vinyl copolymer resin (a2).

In one embodiment, the rubber-modified aromatic vinyl copolymer resin may have a rubber (rubber polymer) content of about 5 wt % to about 50 wt %. The rubber polymer may have an average (Z-average) particle diameter of about 0.2 μm to about 15 μm, for example, about 0.3 μm to about 10 μm. When the amount and average particle diameter of the rubber polymer fall within these ranges, the thermoplastic resin composition can have good impact resistance and low gloss, thereby exhibiting textures of paper.

Now, the graft copolymer resin (a1) and the aromatic vinyl copolymer resin (a2) will be described in more detail.

(a1) Graft Copolymer Resin

The graft copolymer resin may be obtained by grafting an aromatic vinyl monomer and a monomer copolymerizable with the aromatic vinyl monomer to a rubber polymer, and may further include a monomer for imparting processability and heat resistance, as needed.

Examples of the rubber polymer may include: diene rubbers such as polybutadiene, poly(styrene-butadiene) and poly(acrylonitrile-butadiene); saturated rubbers obtained by adding hydrogen to the diene rubbers; isoprene rubbers; acrylate rubbers such as polybutyl acrylate; and an ethylene-propylene-diene terpolymer (EPDM). These may be used alone or as a mixture thereof.

For example, the rubber polymer may be a diene rubber, specifically a butadiene rubber. The rubber polymer may be present in an amount of about 5 wt % to about 65 wt %, for example about 10 wt % to about 60 wt %, specifically about 20 wt % to about 50 wt % based on the total weight of the graft copolymer resin (a1). Within this range, the rubber-modified aromatic vinyl resin can exhibit good mechanical properties such as impact resistance. The rubber polymer (rubber particles) may have an average (Z-average) particle diameter of about 0.2 µm to about 15 µm, for example, about 0.3 µm to about 10 µm. When the average particle diameter of the rubber polymer falls within these ranges, the thermoplastic resin composition can have good impact resistance and low gloss, thereby exhibiting textures of paper.

The aromatic vinyl monomer is graft-copolymerizable with the rubber polymer, and examples of the aromatic vinyl monomer styrene may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These compounds may be used alone or as a mixture thereof. The aromatic vinyl monomer may be present in an amount of about 15 wt % to about 94 wt %, for example, about 20 wt % to about 80 wt %, specifically about 30 wt % to about 60 wt %, based on the total weight of the graft copolymer resin (a1). Within this range of the aromatic vinyl monomer, the rubber-modified aromatic vinyl resin can have good mechanical properties.

Examples of the monomer copolymerizable with the aromatic vinyl monomer may include vinyl cyanide compounds such as acrylonitrile and unsaturated nitrile compounds such as ethacrylonitrile and methacrylonitrile. These compounds may be used alone or as a mixture thereof. The monomer copolymerizable with the aromatic vinyl monomer may be present in an amount of about 1 wt % to about 50 wt %, for example, about 5 wt % to about 45 wt %, specifically about 10 wt % to about 30 wt %, based on the total weight of the graft copolymer resin. When the amount of the aromatic vinyl monomer falls within this range, the rubber-modified aromatic vinyl resin can have good mechanical properties.

Examples of the monomer for imparting processability and heat resistance may include acrylic acid, methacrylic acid, maleic anhydride, and N-substituted maleimide, without being limited thereto. These compounds may be used alone or as a mixture thereof. The monomer for imparting processability and heat resistance may be present in an amount of about 0 wt % to about 15 wt %, for example, about 0.1 wt % to about 10 wt %, based on the total weight of the graft copolymer resin. Within this range, the monomer for imparting processability and heat resistance can impart processability and heat resistance to the rubber-modified aromatic vinyl resin without deterioration in other properties.

(a2) Aromatic Vinyl Copolymer Resin

The aromatic vinyl copolymer resin may be prepared using a monomer mixture comprising the monomer components of the graft copolymer resin (a1), other than the rubber polymer, and the amount ratio between the monomer components may vary depending on, for example, desired compatibility. For example, the aromatic vinyl copolymer resin may be obtained by copolymerizing the aromatic vinyl monomer with the monomer copolymerizable with the aromatic vinyl monomer.

Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These compounds may be used alone or as a mixture thereof.

In addition, examples of the monomer copolymerizable with the aromatic vinyl monomer may include vinyl cyanide compounds such as acrylonitrile and unsaturated nitrile compounds such as ethacrylonitrile and methacrylonitrile. These compounds may be used alone or as a mixture thereof.

The aromatic vinyl copolymer resin may further include the monomer for imparting processability and heat resistance, as needed. Examples of the monomer for imparting processability and heat resistance may include acrylic acid, methacrylic acid, maleic anhydride, and N-substituted maleimide, without being limited thereto. These compounds may be used alone or as a mixture thereof.

The aromatic vinyl monomer may be present in an amount of about 50 wt % to about 95 wt %, for example, about 60 to about 90 wt %, specifically about 70 wt % to about 80 wt %, based on the total weight of the aromatic vinyl copolymer resin. When the amount of the aromatic vinyl monomer falls within this range, the rubber-modified aromatic vinyl resin can have good impact strength and balance between mechanical properties.

The monomer copolymerizable with the aromatic vinyl monomer may be present in an amount of about 5 wt % to about 50 wt %, for example, about 10 wt % to about 40 wt %, specifically about 20 wt % to about 30 wt %, based on the total weight of the aromatic vinyl copolymer resin. When the amount of the monomer copolymerizable with the aromatic vinyl monomer falls within this range, the rubber-modified aromatic vinyl resin can have good impact strength and balance between mechanical properties.

In addition, the monomer for imparting processability and heat resistance may be present in an amount of about 0 wt % to about 30 wt %, for example, about 0.1 to about 20 wt %, based on the total weight of the aromatic vinyl copolymer resin. Within this range, the monomer for imparting processability and heat resistance can impart processability and heat resistance to the rubber-modified aromatic vinyl resin without deterioration in other properties.

The aromatic vinyl copolymer resin may have a weight average molecular weight of about 50,000 g/mol to about 500,000 g/mol, without being limited thereto.

As the rubber-modified aromatic vinyl copolymer resin, the graft copolymer resin (a1) may be used alone or in combination with the aromatic vinyl copolymer resin (a2). When the graft copolymer resin (a1) is used alone, the rubber-modified aromatic vinyl copolymer resin may be, for example, a copolymer (g-ABS) obtained by grafting a styrene monomer, which is an aromatic vinyl monomer, and an acrylonitrile monomer, which is an unsaturated nitrile compound, to a butadiene rubber polymer core. When the graft copolymer resin (a1) is used in combination with the aromatic vinyl copolymer resin (a2), the rubber-modified aromatic vinyl copolymer resin may be, for example, an acrylonitrile-butadiene-styrene copolymer resin (ABS), an acrylonitrile-ethylene propylene rubber-styrene copolymer resin (AES), or an acrylonitrile-acrylic rubber-styrene copolymer resin (AAS). Here, the ABS resin may have a structure in which g-ABS, as the graft copolymer resin (a1), is dispersed in a styrene-acrylonitrile copolymer resin (SAN), as the aromatic vinyl copolymer resin (a2).

(B) Matting Agent

The matting agent according to the invention allows the thermoplastic resin composition to exhibit gloss of paper. For example, the matting agent may be a polymer of a reaction mixture including (b1) an aromatic vinyl compound, (b2) a vinyl cyanide compound, and (b3) a silicone compound.

(b1) Aromatic Vinyl Compound

Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. Specifically, the aromatic vinyl monomer may be styrene, α-methylstyrene, or a mixture thereof.

The aromatic vinyl compound may be present in an amount of about 60 wt % to about 80 wt %, for example, about 65 wt % to about 75 wt %, based on the total weight of a monomer mixture comprising the aromatic vinyl compound and the vinyl cyanide compound ((b1)+(b2)). When the amount of aromatic vinyl compound falls within this range, the thermoplastic resin composition can exhibit gloss of paper while having good impact strength and heat resistance.

(b2) Vinyl Cyanide Compound

Examples of the vinyl cyanide compound may include acrylonitrile, methacrylonitrile, ethacrylonitrile, phenyl acrylonitrile, α-chloroacrylonitrile, fumaronitrile and mixtures thereof, without being limited thereto. Specifically, the vinyl cyanide compound may be acrylonitrile or methacrylonitrile.

The vinyl cyanide compound may be present in an amount of about 20 wt % to about 40 wt %, for example, about 25 wt % to about 35 wt %, based on the total weight of the monomer mixture comprising the aromatic vinyl compound and the vinyl cyanide compound ((b1)+(b2)). When the amount of the vinyl cyanide compound falls within this range, the thermoplastic resin composition can exhibit gloss of paper while securing good properties in terms of mechanical properties, formability, and matting properties.

(b3) Silicone Compound

The silicone compound serves to provide impact resistance and matting properties. For example, the silicone compound may include at least one of a first silicone compound represented by Formula 1 and a second silicone compound represented by Formula 2. Specifically, the silicone compound may be a mixture of the first silicone compound and the second silicone compound, without being limited thereto.

In one embodiment, the first silicone compound, represented by Formula 1, may have a weight average molecular weight of about 150 g/mol to less than about 6,000 g/mol, as measured by gel permeation chromatography (GPC) and may contain at least two unsaturated reactive groups.

<Formula 1>

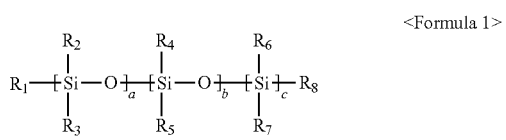

In Formula 1, a, b and c are each independently an integer of 0 to 79 (a, b and c not being 0 at the same time, a+b+c ranging from 1 to 79); $R_1$ to $R_8$ are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; at least two of $R_1$ to $R_8$ are a polymerizable unsaturated reactive group; and the compound represented by Formula 1 has a linear or cyclic structure. For example, $R_1$ to $R_8$ may be linked together or form a single bond to form a cyclic compound represented by Formula 1a:

<Formula 1a>

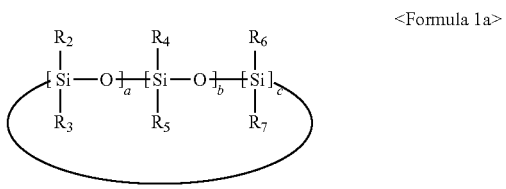

In Formula 1a, a, b, c and $R_2$ to $R_7$ are as defined in Formula 1.

As used herein, unless otherwise stated, the term "substituted" means that at least one hydrogen atom in a functional group is substituted with a substituent including a halogen, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a hydroxyl group, a $C_1$ to $C_{20}$ alkoxy group, a (meth)acrylate group, an amino group, an epoxy group, a carboxyl group, an ester group, an isocyanate group, a mercapto group, or a combination thereof.

In addition, "(meth)acrylic" refers to "acrylic" and/or "methacrylic". For example, "(meth)acrylate" refers to "acrylate" and/or "methacrylate".

In one embodiment, the compound represented by Formula 1 may include a (cyclic) compound represented by Formula 3:

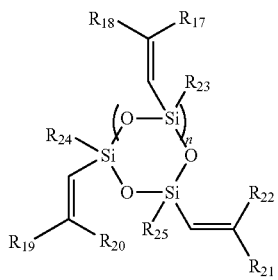

<Formula 3>

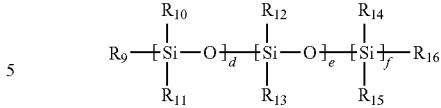

<Formula 2>

In Formula 3, $R_{17}$ to $R_{22}$ are each independently a hydrogen atom, a substituted or unsubstituted $C_1$ to $C_{20}$ alkyl group, a substituted or unsubstituted $C_2$ to $C_{20}$ alkenyl group, a substituted or unsubstituted $C_6$ to $C_{20}$ aryl group; $R_{23}$ to $R_{25}$ are each independently a hydrogen atom or a substituted or unsubstituted $C_1$ to $C_6$ alkyl group; and n is an integer of 1 to 6.

Examples of the first silicone compound may include 1,3,5-triisopropyl-1,3,5-trivinyl-cyclotrisiloxane, 1,3,5,7-tetraisopropyl-1,3,5,7-tetravinyl-cyclotetrasiloxane, 1,3,5,7,9-pentaisopropyl-1,3,5,7,9-pentavinyl-cyclopentasiloxane, 1,3,5-tri-sec-butyl-1,3,5-trivinyl-cyclotrisiloxane, 1,3,5,7-tetra-sec-butyl-1,3,5,7-tetravinyl-cyclotetrasiloxane, 1,3,5,7,9-penta-sec-butyl-1,3,5,7,9-pentavinyl-cyclopentasiloxane, 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and mixtures thereof. For example, the first silicone compound may be obtained by mixing compounds, such as divinylsilane, trivinylsilane, dimethyldivinylsilane, divinylmethylsilane, methyltrivinylsilane, diphenyldivinylsilane, divinylphenylsilane, trivinylphenylsilane, divinylmethylphenylsilane, tetravinylsilane, dimethylvinyldisiloxane, and divinyldiphenylchlorosilane, without being limited thereto. Preferably, the first silicone compound is 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, or a mixture thereof, more preferably 1,3,5,7-tetramethyl-1,3,5,7-tetravinyl-cyclotetrasiloxane.

In one embodiment, the first silicone compound may have a weight average molecular weight of about 150 g/mol to less than about 6,000 g/mol, for example, about 150 g/mol to about 3,000, specifically about 150 g/mol to about 1,000 g/mol. When the weight average molecular weight of the first silicone compound falls within this range, a degree of crosslinking of the copolymer can be easily controlled, a crosslinking reaction proceeds smoothly, and good matting properties can be realized.

In one embodiment, the second silicone compound, represented by Formula 2, may have a weight average molecular weight of about 6,000 g/mol to about 100,000 g/mol, as measured by gel permeation chromatography (GPC) and may contain at least two unsaturated reactive groups.

In Formula 2, d, e and f are each independently an integer of 0 to 1,500 (d, e and f not being 0 at the same time, d+e+f ranging from 80 to 1,500); $R_9$ to $R_{16}$ are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; and at least two of $R_9$ to $R_{16}$ are a polymerizable unsaturated reactive group.

In one embodiment, the compound represented by Formula 2 may be a compound represented by Formula 2a, without being limited thereto:

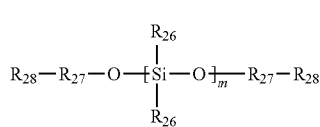

<Formula 2a>

In Formula 2a, each $R_{26}$ is independently a hydrogen atom or a $C_1$ to $C_{20}$ alkyl group; each $R_{27}$ is independently a single bond or a $C_1$ to $C_{10}$ alkenyl group; each $R_{28}$ is independently a vinyl group, a (meth)acrylate group, or an epoxy group; and m is an integer of 80 to 1,500.

For example, the compound represented by Formula 2a may be methacrylated polydimethylsiloxane (MPDMS) having a weight average molecular weight of about 6,000 g/mol to about 100,000 g/mol ($R_{26}$: methyl group, $R_{27}$: propylene group, $R_{28}$: (meth)acrylate group), without being limited thereto.

In one embodiment, the second silicone compound may have a weight average molecular weight of about 6,000 g/mol to about 100,000 g/mol, for example, about 6,500 g/mol to about 30,000 g/mol, specifically about 7,000 g/mol to about 20,000 g/mol. When the weight average molecular weight of the second silicone compound falls within this range, a degree of crosslinking of the copolymer can be easily controlled, a crosslinking reaction proceeds smoothly, and good matting properties can be realized.

In addition, a difference in weight average molecular weight between the first silicone compound and the second silicone compound may range from about 5,000 to about 20,000 g/mol, for example, about 5,400 to about 19,850 g/mol, specifically about 8,000 to about 12,000 g/mol. When the difference in weight average molecular weight falls within this range, the thermoplastic resin composition can have good impact resistance and matting properties.

In one embodiment, the silicone compound may be present in an amount of about 0.1 parts by weight to about 20 parts by weight, for example, about 0.5 parts by weight to about 10 parts by weight, relative to about 100 parts by weight of the monomer mixture ((b1)+(b2)). Within this range, the degree of crosslinking of the copolymer can be easily controlled, and good matting properties can be realized without deterioration in impact resistance and heat resistance.

In one embodiment, a weight ratio of the first silicone compound to the second silicone compound may range from about 1:0.1 to about 1:3, for example, about 1:0.25 to about 1:1.5. Within this range of weight ratio, a degree of crosslinking of the copolymer can be easily controlled and good impact resistance and matting properties can be realized.

In one embodiment, the reaction mixture may further include a polyfunctional vinyl compound including at least one of divinyl benzene, ethylene glycol di(meth)acrylate, allyl (meth)acrylate, diallyl phthalate, diallyl maleate and triallyl isocyanurate so as to control the crosslinking degree and polymerization rate of the copolymer. The polyfunctional vinyl compound may be present in an amount of about 0.001 parts by weight to about 10 parts by weight, for example, about 0.01 parts by weight to about 3 parts by weight, relative to about 100 parts by weight of the monomer mixture ((b1)+(b2)). When the amount of the polyfunctional vinyl compound falls within this range, the crosslinking degree and polymerization rate of the copolymer can be easily controlled and good matting properties can be realized without deterioration in impact resistance and heat resistance.

In one embodiment, the matting agent may be prepared by any typical polymerization method such as suspension polymerization, emulsion polymerization and solution polymerization, without being limited thereto. For example, the matting agent may be prepared by suspension polymerization. Specifically, the matting agent may be prepared thought a process in which, after a polymerization initiator and a chain transfer agent are added to the reaction mixture to prepare a reaction mixture solution, the reaction mixture solution is introduced into an aqueous solution with a suspension stabilizer dissolved therein, followed by suspension polymerization. Here, time and temperature for suspension polymerization may be appropriately adjusted. For example, suspension polymerization may be performed at about 65° C. to about 125° C., specifically about 70° C. to about 120° C. for about 1 to 8 hours.

The polymerization initiator may include any typical radical polymerization initiator known in the art, for example, octanoyl peroxide, decanoyl peroxide, lauroyl peroxide, benzoyl peroxide, monochlorobenzoyl peroxide, dichlorobenzoyl peroxide, p-methyl benzoyl peroxide, tert-butyl perbenzoate, azobisisobutyronitrile and azobis-(2,4-dimethyl)-valeronitrile, without being limited thereto. These may be used alone or as a mixture thereof. The polymerization initiator may be present in an amount of about 0.01 parts by weight to about 10 parts by weight, for example, about 0.03 parts by weight to about 5 parts by weight, relative to about 100 parts by weight of the reaction mixture, without being limited thereto.

The chain transfer agent serves to control the weight average molecular weight of the matting agent and to improve thermal stability. The chain transfer agent may include any typical chain transfer agent known in the art, for example, alkyl mercaptans represented by $CH_3(CH_2)_nSH$ (n being an integer of 1 to 20) such as n-butyl mercaptan, n-octyl mercaptan, n-dodecyl mercaptan, t-dodecyl mercaptan, isopropyl mercaptan, and n-amyl mercaptan; halogen compounds such as carbon tetrachloride; and aromatic compounds such as α-methyl styrene dimer or α-ethyl styrene dimer, without being limited thereto. These compounds may be used alone or as a mixture thereof. The chain transfer agent may be present in an amount of about 0.01 parts by weight to about 10 parts by weight, for example, about 0.02 parts by weight to about 5 parts by weight, relative to about 100 parts by weight of the reaction mixture. When the amount of the chain transfer agent falls within this range, a copolymer (matting agent) having high thermal stability and appropriate molecular weight can be prepared.

In one embodiment, the matting agent may be prepared through a process in which the reaction mixture is introduced into an aqueous solution containing at least one additive selected from among a suspension stabilizer, a suspension stabilization aid, an antioxidant and the like, followed by polymerization. The additive may be present in an amount of about 0.001 parts by weight to about 20 parts by weight relative to about 100 parts by weight of the reaction mixture.

Examples of the suspension stabilizer may include: organic suspension stabilizers such as homopolymers or copolymers of acrylic acid or methacrylic acid, polyalkyl acrylate-acrylic acid, polyolefin-maleic acid, polyvinyl alcohol, and cellulose; inorganic suspension stabilizers such as tricalcium phosphate; and mixtures thereof, without being limited thereto. Here, the acrylic acid or methacrylic acid may be in the form of a salt of sodium, potassium, or ammonium to provide appropriate solubility.

Examples of the suspension stabilization aid may include disodium hydrogen phosphate and sodium dihydrogen phosphate. In addition, in order to control solubility of a water-soluble polymer or monomer, for example, sodium sulfate may be added to the suspension stabilization aid.

Examples of the antioxidant may include octadecyl 3-(3,5-di-tertiary-butyl-4-hydrophenyl) propionate, triethylene glycol-bis-3-(tertiary-butyl-4-hydroxy-5-methylphenyl) propionate, 2,6-di-tertiary-butyl-4-methylphenol, 2,2'-methylene bis(4-methyl-6-tertiary-butyl phenol), tri(2,4-di-tertiary-butylphenyl) phosphite, normal-octadecyl-3-(3,5-di-tertiary-butyl-4-hydroxyphenyl) propionate, 1,3,5-tri(3,5-di-tertiary-butyl-4-hydroxybenzyl) isocyanate, distearyl thiodipropionate, lauryl thiopropionate methane, and diphenyl-isooctyl phosphite, without being limited thereto. These compounds may be used alone or as a mixture thereof.

After completion of polymerization, cooling, washing, dehydrating, and drying may be performed to obtain a particulate matting agent. In addition, the matting agent (copolymer) may be a branched and/or cross-linked copolymer.

In some embodiments, the matting agent may be present in an amount of about 1 part by weight to about 30 parts by weight, for example, about 3 parts by weight to about 20 parts by weight, relative to about 100 parts by weight of the rubber-modified aromatic vinyl resin. When the amount of the matting agent falls within this range, the thermoplastic resin composition can exhibit gloss of paper.

(C) Needle-Like Fillers

The needle-like fillers according to the present invention serve to realize a visual texture of paper such as uniform formation of paper (due to pulp aggregation) and grain of paper (due to pulp arrangement) and a tactile texture (surface quality) of paper, in combination with the flake fillers. Examples of the needle-like fillers may include glass fibers, wollastonite, whisker, basalt fibers, and combinations thereof.

In one embodiment, the needle-like (fiber-like) fillers may have an average diameter (D) of about 0.3 μm to about 15 μm, for example, about 0.5 μm to about 13 μm, an average length (L) of about 3 μm to about 3,000 μm, for example, about 5 μm to about 2,600 μm, and a ratio of average length to average diameter (aspect ratio, L/D) of about 10 to about 200, for example, about 20 to about 100. When the size parameter values of the needle-like fillers fall within this range, the thermoplastic resin composition can exhibit visual and tactile textures of paper.

In one embodiment, the needle-like fillers may be present in an amount of about 5 parts by weight to about 30 parts by weight, for example, about 10 parts by weight to about 20 parts by weight, relative to about 100 parts by weight of the rubber-modified aromatic vinyl resin. When the amount of the needle-like fillers falls within this range, the thermoplastic resin composition can exhibit visual and tactile textures of a variety of papers.

(D) Flake Fillers

The flake fillers according to the present invention serve to realize a visual texture of paper such as uniform formation of paper (due to pulp aggregation) and a tactile texture (surface quality) of paper, in combination with the needle-like fillers. Examples of the flake fillers may include (synthetic) mica, talc, metal flakes, and combinations thereof.

In one embodiment, the flake fillers may be thin film-type fillers with a Z-axis length (thickness) smaller than X-axis and Y-axis lengths (representing cross-sectional area) and may have an average thickness of about 30 nm to about 700 nm, for example, about 30 nm to about 300 nm and a ratio of average diameter (average of X-axis and Y-axis lengths) to average thickness (Z-axis length) (aspect ratio, diameter/length) of about 4 to about 30, for example, about 10 to about 30. In addition, the flake fillers may have an average particle size of about 0.65 μm to about 5.0 μm, for example, about 0.65 μm to about 2.7 μm, specifically about 0.8 μm to about 2.5 μm. Here, the average particle size of the flake fillers refers to a median value of a particle size distribution measured by an X-ray transmission method. Specifically, the average particle size may be found by forcing X-rays to pass through settling particles to obtain the particle size distribution of the flake fillers and calculating the median value of the size distribution. When the size parameter values of the flake fillers fall within this range, the thermoplastic resin composition can exhibit visual and tactile textures of paper.

In one embodiment, the flake fillers may be present in an amount of about 0.1 to about 5 parts by weight, for example, about 0.5 to about 3 parts by weight, relative to about 100 parts by weight of the rubber-modified aromatic vinyl resin. When the amount of the flake fillers falls within this range, the thermoplastic resin composition can exhibit visual and tactile textures of a variety of papers.

In addition, a weight ratio of the flake fillers to the needle-like fillers may range from about 1:2.5 to about 1:15, for example, about 1:5 to about 1:14. When the weight ratio falls within this range, the thermoplastic resin composition can exhibit visual and tactile textures of a variety of papers.

The thermoplastic resin composition according to the present invention may further include dyes, pigments, or combinations thereof so as to control gloss and whiteness of a molded product formed therefrom and to realize colors of various papers. The dyes and the pigments may include any typical dyes and pigments used in thermoplastic resin compositions without affecting the advantageous effects of the present invention.

In one embodiment, the dyes, the pigments, or combinations thereof may be present in an amount of about 0.1 parts by weight to about 15 parts by weight, for example, about 0.1 parts by weight to about 10 parts by weight, relative to about 100 parts by weight of the rubber-modified aromatic vinyl resin, although the amounts thereof can vary depending on desired color and gloss.

In addition, the thermoplastic resin composition may further include: a thermoplastic resin other than the rubber-modified aromatic vinyl resin, for example, a thermoplastic resin including a polycarbonate resin, a poly(meth)acrylate resin, and a mixture thereof; and additives so as to impart or enhance physical properties such as impact resistance and flame retardancy. Examples of the additives may include a flame retardant, an antioxidant, an anti-dropping agent, a lubricant, a release agent, a nucleating agent, an antistatic agent, a stabilizer, and mixtures thereof.

The thermoplastic resin composition according to the present invention can exhibit tactile and visual textures of paper and may have a surface roughness (Ra) of about 2.5 μm to about 3.5 μm, for example, about 2.7 μm to about 3.3 μm, as measured on an injection-molded specimen in accordance with ASTM D4417-B (injection temperature: about 200° C. to about 230° C., mold temperature: about 40° C. to about 80° C.).

In addition, the thermoplastic resin composition may have a gloss of about 35% to about 55%, for example, about 40% to about 50%, as measured on an injection-molded specimen at an angle of 60 degrees in accordance with ASTM D523 (injection temperature: about 200° C. to about 230° C., mold temperature: about 40° C. to about 80° C.).

In accordance with another aspect of the present invention, a molded product is formed of the thermoplastic resin composition set forth above. The thermoplastic resin composition according to the present invention may be prepared by any known method of preparing thermoplastic resin compositions. For example, the aforementioned components and, optionally, other additives are mixed, followed by melt extrusion in an extruder, thereby preparing a thermoplastic resin composition in pellet form. The prepared pellets may be produced into various molded products (products) by various molding methods, such as injection molding, extrusion, vacuum molding, and casting. Specifically, the molded product may be fabricated by an injection molding process which is performed at an injection temperature of about 200° C. to about 230° C. at a mold temperature of about 40° C. to about 80° C. using a typical injection molding machine. In this case, the molded product can have tactile and visual textures of paper. Such molding methods are well known to those skilled in the art. The molded product according to the present invention can exhibit textures of paper and may be used in various fields such as interior/exterior materials for automobile parts or electric/electronic products, wallpapers, and exterior materials for buildings.

MODE FOR INVENTION

Next, the present invention will be described in more detail with reference to some examples. It should be understood that these examples are provided for illustration only and are not to be construed in any way as limiting the present invention.

Example

Details of components used in the following Examples and Comparative Examples are as follows:

(A) Rubber-Modified Aromatic Vinyl Resin

A rubber-modified aromatic vinyl resin (g-ABS:SAN=25:75) obtained by mixing a core-shell type graft copolymer resin (g-ABS, average rubber particle size (Z-average): 290 nm) prepared by grafting 40 parts by weight of a monomer mixture comprising 67 wt % of styrene and 33 wt % of acrylonitrile to 60 parts by weight of polybutadiene rubber with an aromatic vinyl copolymer resin (SAN) (weight average molecular weight: 100,000 g/mol) prepared by suspension polymerization of a monomer mixture comprising 76 wt % of styrene and 24 wt % of acrylonitrile (B) Matting Agent 2 parts by weight of 1,3,5,7-tetramethyl-1,3,5,7-tetravinyl-cyclotetrasiloxane (weight average molecular weight: 344.7 g/mol) and 0.5 parts by weight of methacrylated polydimethylsiloxane (MPDMS, weight average molecular weight: 9,000 g/mol) were mixed with 100 parts by weight of a monomer mixture comprising 76 wt % of styrene and 24 wt % of acrylonitrile, thereby obtaining a reaction mixture. Then, 0.2 parts by weight of a chain transfer agent (t-dodecyl mercaptan (TDM)) and 0.2 parts by weight of a polymerization initiator (azobisisobutyronitrile (AIBN)) were added to 100 parts by weight of the reaction mixture, followed by suspension polymerization at 75° C. for 5 hours subsequent to introduction of the resulting mixture into an aqueous solution with a suspension stabilizer dissolved therein (suspension stabilizer (tricalcium phosphate): 0.5 parts by weight, deionized water: 140 parts by weight), thereby preparing a matting agent.

(C) Needle-Like Fillers

Glass fiber (ECS 03T-187H, NITTOBO ASIA Glass Fiber Co., Ltd.)

(D) Flake Fillers

Mica (N801F, CQV Co., Ltd.)

Examples 1 to 3 and Comparative Examples 1 to 3

The aforementioned components and, optionally, a pigment were mixed in amounts as listed in Table 1, followed by melt extrusion in a twin-screw type extruder (L/D=35, φ=45 mm) at 220° C., thereby preparing pellets. The prepared pellets were dried at 80° C. for 2 hours or more, followed by injection molding using a 10 oz. injection machine at an injection temperature of 230° C. and a mold temperature of 60° C., thereby preparing a specimen. Each of the specimens was evaluated as to the following properties. Results are shown in Table 1. FIG. 1 is an image of the surface of a specimen prepared in Example 1.

Property Evaluation (1) Uniform formation of paper (due to pulp aggregation) and grain of paper (due to pulp arrangement): Each of the specimens was visually compared with a piece of paper having the same size (PRETTIER, Doosung Paper), as a reference example. When 80% of the surface of the specimen exhibited uniform formation and grain of paper, the specimen was rated as ⊚, when 40% to less than 80% of the surface of the specimen exhibited uniform formation and grain of paper, the specimen was rated as ○, and when less than 40% of the surface of the specimen exhibited uniform formation and grain of paper and grain of paper, the specimen was rated as X.

(2) Gloss (surface gloss, unit: %): Gloss of each of the specimens was measured at an angle of 60° using a gloss meter (4520, BYK GARDNER) in accordance with ASTM D523.

(3) Surface roughness (unit: μm): Surface roughness (Ra) of each of the specimens was measured using a surface roughness meter (Laser Microscope VK-X200, KEYENCE CORPORATION) in accordance with ASTM D4417-B.

TABLE 1

|  | Example | | Reference Example | Comparative Example | | |
| --- | --- | --- | --- | --- | --- | --- |
|  | 1 | 2 | 1 | 1 | 2 | 3 |
| (A) (parts by weight) | 100 | 100 | Paper (PRETTIER) | 100 | 100 | 100 |
| (B) (parts by weight) | 20 | 20 |  | — | — | — |
| (C) (parts by weight) | 20 | 20 |  | — | 20 | 30 |
| (D) (parts by weight) | 2 | 1.5 |  | — | — | — |
| Uniform formation | ⊚ | ⊚ | ⊚ | X | X | X |
| Grain | ○ | ○ | ○ | X | X | X |
| Gloss (%) | 49 | 44 | 15 | 98 | 86 | 79 |
| Surface roughness (μm) | 2.9 | 3.0 | 4.5 | 0.7 | 1.6 | 2.0 |

From the results shown in Table 1, it can be seen that the thermoplastic resin composition according to the present invention (Examples 1 and 2) exhibited visual and tactile textures of paper.

Conversely, it can be seen that the thermoplastic resin of Comparative Example 1, not including a matting agent, needle-like fillers and flake fillers, did not exhibit textures of paper, and the thermoplastic resins of Comparative Examples 2 and 3, not including a matting agent and flake fillers, did not exhibit uniform formation and grain of paper and gloss of paper.

It should be understood that various modifications, changes, alterations, and equivalent embodiments can be made by those skilled in the art without departing from the spirit and scope of the invention.

The invention claimed is:

1. A thermoplastic resin composition comprising:
   a rubber-modified aromatic vinyl resin;
   a matting agent;
   needle fillers comprising glass fibers, wollastonite, whisker, and/or basalt fibers; and
   flake fillers comprising mica, talc and/or metal flakes, wherein a weight ratio of the flake fillers to the needle fillers ranges from about 1:2.5 to about 1:15,
   wherein the matting agent is a polymer of a reaction mixture comprising an aromatic vinyl compound, a vinyl cyanide compound, and a silicone compound, and the reaction mixture further comprises a polyfunctional vinyl compound comprising divinyl benzene, ethylene glycol di(meth)acrylate, allyl (meth)acrylate, diallyl phthalate, diallyl maleate, and/or triallyl isocyanurate.

2. The thermoplastic resin composition according to claim 1, wherein the composition comprises: about 100 parts by weight of the rubber-modified aromatic vinyl resin, about 1 part by weight to about 30 parts by weight of the matting agent, about 5 parts by weight to about 30 parts by weight of the needle fillers, and about 0.1 parts by weight to about 5 parts by weight of the flake fillers.

3. The thermoplastic resin composition according to claim 1, wherein the rubber-modified aromatic vinyl resin comprises: about 10 wt % to 100 wt % of a graft copolymer resin obtained by grafting an aromatic vinyl monomer and a monomer copolymerizable with the aromatic vinyl monomer to a rubber polymer having an average (Z-average) particle size of about 0.2 μm to about 15 μm; and optionally about 90 wt % or less of an aromatic vinyl copolymer resin obtained by copolymerizing an aromatic vinyl monomer with a monomer copolymerizable with the aromatic vinyl monomer.

4. The thermoplastic resin composition according to claim 1, wherein the silicone compound is present in an amount of 0.1 parts by weight to about 20 parts by weight relative to about 100 parts by weight of a monomer mixture comprising about 60 wt % to about 80 wt % of the aromatic vinyl compound and about 20 wt % to about 40 wt % of the vinyl cyanide compound.

5. The thermoplastic resin composition according to claim 1, wherein the silicone compound comprises at least one of a first silicone compound represented by Formula 1 and a second silicone compound represented by Formula 2:

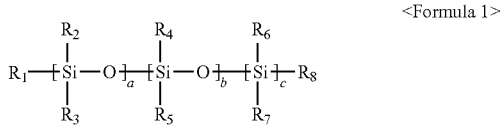
<Formula 1> wherein a, b and c are each independently an integer of 0 to 79, with the proviso that a, b and c are not all 0 at the same time, and a+b+c ranges from 1 to 79; $R_1$ to $R_8$ are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; with the proviso that at least two of $R_1$ to $R_8$ are a polymerizable unsaturated reactive group; and the compound represented by Formula 1 has a linear structure or a cyclic structure in which $R_1$ to $R_8$ are linked together or form a single bond; and

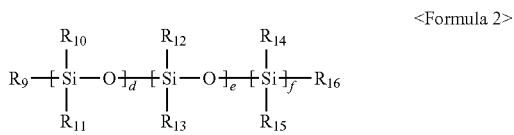
<Formula 2> wherein d, e and f are each independently an integer of 0 to 1,500 with the proviso that d, e and f are not all 0 at the same time, and d+e+f ranges from 80 to 1,500; $R_9$ to $R_{16}$ are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; and with the proviso that at least two of $R_9$ to $R_{16}$ are a polymerizable unsaturated reactive group.

6. The thermoplastic resin composition according to claim 5, wherein the first silicone compound comprises a compound represented by Formula 3:

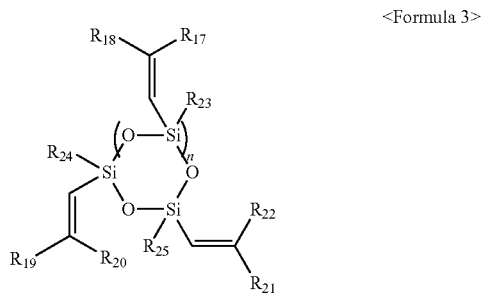
<Formula 3> wherein $R_{17}$ to $R_{22}$ are each independently a hydrogen atom, a substituted or unsubstituted $C_1$ to $C_{20}$ alkyl group, a substituted or unsubstituted $C_2$ to $C_{20}$ alkenyl group, or a substituted or unsubstituted $C_6$ to $C_{20}$ aryl group; $R_{23}$ to $R_{25}$ are each independently a hydrogen atom or a substituted or unsubstituted $C_1$ to $C_6$ alkyl group; and n is an integer of 1 to 6.

7. The thermoplastic resin composition according to claim 5, wherein the first silicone compound has a weight average molecular weight of about 150 g/mol to about 3,000 g/mol, and the second silicone compound has a weight average molecular weight of about 6,500 g/mol to about 30,000 g/mol.

8. The thermoplastic resin composition according to claim 1, wherein the composition further comprises: a dye, a pigment, or a combination thereof.

9. The thermoplastic resin composition according to claim 1, wherein the thermoplastic resin composition has a surface roughness (Ra) of about 2.5 μm to about 3.5 μm, as measured on an injection-molded specimen in accordance with ASTM D4417-B.

10. The thermoplastic resin composition according to claim 1, wherein the thermoplastic resin composition has a gloss(60°) of about 35% to about 55%, as measured on an injection-molded specimen at an angle of 60° in accordance with ASTM D523.

11. A molded product formed of the thermoplastic resin composition according to claim 1 and having texture of paper.

* * * * *